March 3, 1936. C. T. EVANS 2,032,743
APPARATUS FOR CONTROLLING THE SPEED OF ELECTRIC MOTORS
Filed Jan. 11, 1934
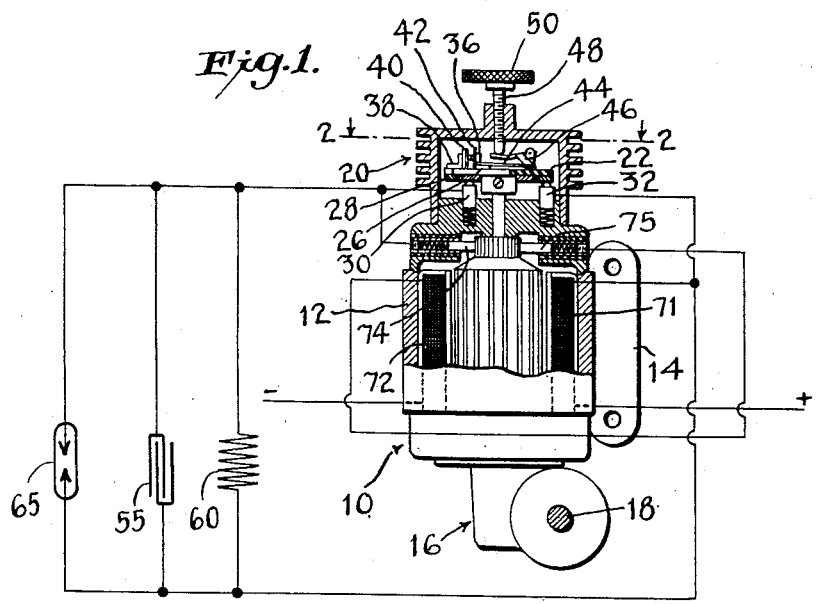
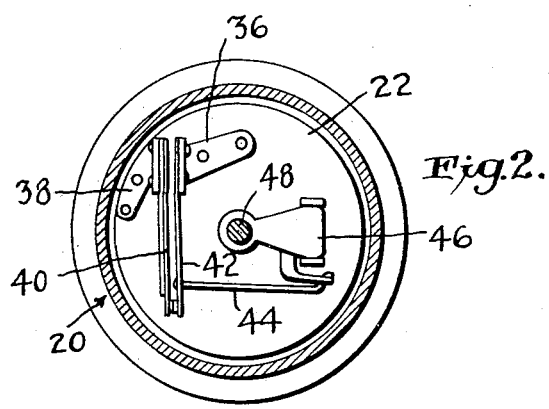
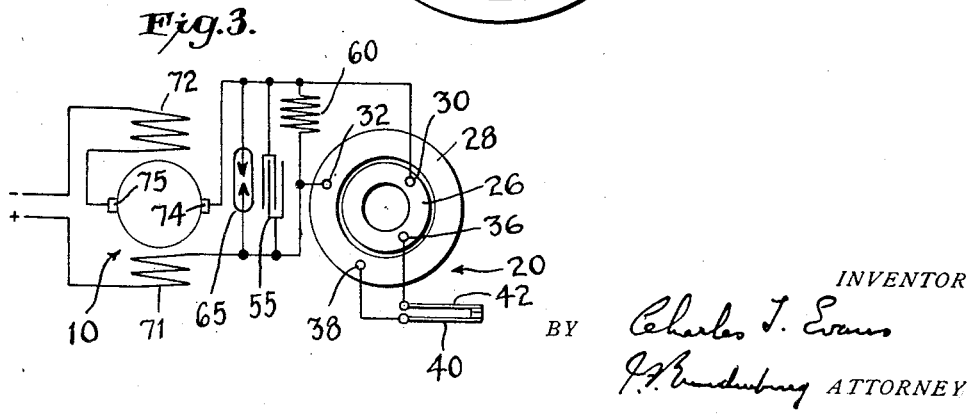
INVENTOR
Charles T. Evans
BY
ATTORNEY Patented Mar. 3, 1936

2,032,743

UNITED STATES PATENT OFFICE 2,032,743

APPARATUS FOR CONTROLLING THE SPEED OF ELECTRIC MOTORS

Charles T. Evans, Jersey City, N. J., assignor to Air Reduction Company, Incorporated, New York, N. Y., a corporation of New York Application January 11, 1934, Serial No. 706,177

9 Claims. (Cl. 175—294)

This invention relates to apparatus for controlling the speed of electric motors.

Centrifugal governors have been successfully used with electric motors of small size to maintain the motor speed very nearly constant. Such governors have switch contacts, one of which moves away from the other to open the circuit through the governor when the motor speed exceeds a given value, and moves back again to close the circuit as soon as the speed drops below the desired value. The circuit through the governor is open and closed at very short intervals.

In order to prevent the switch contacts from being destroyed by constant sparking, a condenser is connected across the governor. A smaller condenser can be used if a high resistance shunt circuit carries a portion of the motor current around the governor. Such a circuit reduces the amount of current flowing through the governor, and while some power reaches the motor through this shunt circuit even when the governor switch is open, this power supplied through the resistance is not enough to maintain the motor speed. The opening of the governor circuit therefore causes the motor to slow down.

Small motors equipped with these governors are frequently connected with industrial power lines which supply large motors and other loads likely to cause surges in the power line. It may be that some power surges originate in the motor circuit instead of in the line which supplies the power for the motor. These surges, whether produced by the loads on the line or other causes, are often severe enough to puncture the dielectric of the governor condenser and cause a short circuit through the condenser. Particularly heavy power surges may also injure other parts of the governor circuit.

Such a breakdown of the condenser makes the governor ineffective to control the motor speed because current flows to the motor through the condenser when the circuit through the governor is open. The speed of the motor becomes variable and uncontrolled. When the motor furnishes the driving power for an operation requiring a substantially uniform motor speed, as in torch cutting or welding, the work is very likely to be ruined in the event of a failure of the governing action. With the governor ineffective, the mechanism driven by the motor is without speed controls, and in mills or factories this means that production is held up until repairs can be made. When repair parts are not immediately available, the loss of production time is increased. These failures of the speed controlling apparatus have proved not only inconvenient but very costly.

It is an object of this invention to provide improved apparatus for controlling the speed of electric motors efficiently and reliably in spite of surges in the power line.

Another object is to provide particularly simple, inexpensive, and effective means for nullifying the effect of power surges on the speed control apparatus of an electric motor.

The principal advantage of the invention is the elimination of governor failures resulting from injury to the circuit by power surges. Another advantage is that this invention permits the use of less expensive and more compact condensers because a lower factor of safety for the condenser is practical.

Other objects, features and advantages of the invention will appear or be pointed out as the description proceeds.

In the accompanying drawing, forming a part hereof:

Fig. 1 is a view, mostly in section, showing an electric motor with speed control apparatus embodying the invention;

Fig. 2 is an enlarged sectional view on the line 2—2 of Fig. 1; and

Fig. 3 is a wiring diagram for the apparatus shown in Fig. 1.

The drawing shows the invention applied to a series-wound motor 10, but the invention is applicable also to other types of motors.

The motor 10 has a frame 12 with a bracket 14 for connection with a machine or other support. The armature shaft extends at one end into a speed reduction unit 16 through which the motor operates a drive shaft 18.

In order to hold the motor speed substantially uniform at any value and to make it possible to adjust the speed instantly and accurately, the motor 10 is equipped with a governor 20. This governor has a plate 22 of insulating material secured to the upper end of the motor armature shaft. Two concentric conductor rings 26 and 28 are fastened to the under side of the plate 22, and these conductor rings are contacted by brushes 30 and 32, respectively.

Two brackets 36 and 38 are fastened to the top of the plate 22 and are electrically connected with the conductor rings 26 and 28, respectively. Spring blade arms 40 and 42 are secured to the brackets 36 and 38 and have contact points at their ends which normally touch each other.

The movement of the contact point end of the arm 62 in one direction is limited by a link 44 connected to a bell-crank lever 46 which is pivotally supported by the plate 22. A speed-adjusting screw 48 threads through the top of the governor casing and bears against one arm of the bell-crank lever 46. The screw 48 has a knob 50 on its upper end for convenient manual adjustment of the governor.

When the motor is running, the contact ends of both arms 40 and 42 tend to move away from the center of rotation by centrifugal force. The ends of the arms 40 and 42 which are secured to the brackets 36 and 38 are fixed with respect to the plate 22, and the arms must therefore bend as the contact points move away from the center of rotation. These arms being of spring material permit the contact points to move further as the speed of the motor increases and the centrifugal force becomes greater. When the arm 42 moves out as far as the link 44 will permit, a further increase in motor speed causes the arm 40 to move away from the arm 42 and break the circuit through the governor. The arms 40 and 42 thus comprise a switch that is opened by centrifugal force at a certain motor speed. Centrifugal governors of this type are well known in the art.

In order to lessen wear on the contact points of the governor switch, a condenser 55 is connected across the brushes 30 and 32. Wear on the contact points is further reduced by also connecting a resistance 60 across the brushes and in parallel with the condenser 55. The resistance 60 serves as a by-pass or shunt through which a fraction of the current to the motor flows around the governor. Thus, the governor switch serves as a conductor for only a part of the total current supplied to the motor.

An electrical discharge device comprising a tube 65, containing electrodes in an atmosphere of neon, is connected across the condenser 55. The tube 65 may be similar to that shown in Patent 1,511,744, dated October 14, 1924. During the ordinary operation of the circuit no current flows through the tube 65, but any surges of a potential likely to injure the condenser or other parts of the circuit will discharge through the gas in the tube. The gas pressure in the tube 65 and the spacing of the electrodes are such that the breakdown voltage of the tube, that is, the voltage necessary to start a discharge through the tube, is well below the maximum voltage which the condenser can stand without danger of injury.

The motor 10 is series-wound and the circuit includes field coils 71, 72 and brushes 74, 75. Current flows from a power line to the field coil 71. From this coil 71 the current flows through parallel circuits to the motor brush 74. One of these parallel circuits is the resistance 60, and the other parallel circuit includes governor brush 32, conductor ring 28, bracket 38, arms 40 and 42, bracket 36, conductor ring 26, and governor brush 30.

From the motor brush 74 current flows through the motor armature, motor brush 75, and field coil 72, back to the power line. The condenser 55 prevents any substantial arcing at the contact points of the governor switch when the circuit is broken. The motor 10 can be operated on either direct or alternating current.

Surges occur in the motor circuit and these surges are sometimes of sufficient potential to break down the condenser insulation and establish a short circuit through the condenser so that the governor switch is no longer effective to control the motor speed. Whether these surges come from the motor or the power line, their effect can be nullified by the tube 65 connected across the condenser and designed to provide a shunt circuit for all power of a voltage high enough to break through the condenser insulation.

One embodiment of the invention has been illustrated and described, but changes and modifications can be made without departing from the invention defined in the claims.

I claim:

1. The combination with an electric motor of a governor including a switch for opening and closing a circuit of the motor to control the motor speed, a condenser connected across the governor switch to prevent sparking at the contact points when the circuit through the governor switch is broken, an electric discharge device connected across the condenser and adapted to discharge current when the voltage across the condenser and switch reaches a given value which is less than the safe maximum voltage of said condenser, and a resistance connected in parallel with the condenser and governor switch, and serving to discharge the condenser and provide a by-pass for current around the governor switch so that only a portion of the current flowing to the motor passes through the governor switch.

2. The combination with a centrifugal governor having a switch for making and breaking a motor circuit, a condenser connected in the circuit with the governor switch to prevent arcing at the contact points when said switch opens to break the circuit, a gas-filled electric discharge device connected in parallel with the condenser and having spaced electrodes between which current flows to partially discharge the condenser when the voltage across the condenser exceeds a given value which is substantially greater than that of the inductive energy in the governor circuit when the switch opens, but less than the maximum safe voltage of said condenser, and a resistance connected in parallel with the condenser to provide a shunt circuit to discharge the condenser.

3. In combination with a centrifugal governor for an electric motor, a condenser connected in the circuit with the governor switch to prevent sparking of said switch when opening, and a discharge device connected in the circuit with the governor and condenser, and constructed and arranged to protect both the governor and condenser from heavy power surges in the governor circuit.

4. In combination with a governor switch for making and breaking a motor circuit; a condenser connected in parallel with the governor switch to prevent arcing at the contact points of said switch; and a gas-filled electric discharge device connected in parallel with the governor switch and the condenser, said discharge device having spaced electrodes between which current flows if the voltage across the device exceeds a given value, whereby power surges of dangerous magnitude are by-passed around the condenser and the governor switch.

5. The combination with an electric motor, of a centrifugal governor having a switch adapted to operate at short intervals to open and close a circuit to control the motor speed, a condenser in the governor circuit to prevent the inductive energy of the circuit from arcing between the contacts of the switch as said switch opens to break the circuit, and an electric discharge device connected with said circuit and constructed and arranged to pass current when the voltage across said discharge device rises to a value substantially greater than that of the normal inductive energy of the governor circuit but less than the maximum capacity of the condenser.

6. The combination with a motor having a governor switch for automatically opening and closing a circuit between the motor and a power line, and a condenser connected in the governor switch circuit and of a capacity to absorb the normal inductive energy of the motor to prevent sparking when the switch is opened, of a discharge device connected across the condenser, said device comprising a neon-filled tube containing electrodes which are spaced to provide a discharge gap wide enough to prevent the flow of power through the tube during the ordinary operation of the circuit, the neon pressure and electrode spacing being of such values that a discharge through the tube will occur when the voltage of the governor circuit rises to a value substantially greater than the line voltage and less than that which will break down the condenser or cause other injury to the governor circuit.

7. An electric circuit including a motor governor which opens and closes a motor circuit; a condenser of substantial capacity connected across the governor to absorb the inductive energy of the motor and prevent arcing when breaking the circuit; and a gas-filled discharge device connected in parallel with the condenser and governor to provide a circuit for electricity when the voltage of the governor circuit rises to the breakdown voltage of the discharge device.

8. The combination with an electric motor of a centrifugal governor including a switch for opening and closing a circuit of the motor to control the motor speed; a condenser connected in the governor switch circuit and adapted to prevent sparking at the switch contact points; and a gas-filled electric discharge device connected in said governor switch circuit in position to protect both the governor switch and condenser from power surges of excessive voltage.

9. The combination with an electric motor of a centrifugal governor including a switch for opening and closing a circuit of the motor to control the motor speed; a condenser connected in the governor switch circuit in position to prevent sparking at the switch contact points; and a neon-filled tube containing spaced electrodes, the pressure of the neon and the gap between the electrodes being of such values that the breakdown voltage of the tube is greater than the voltage induced in the governor switch circuit when the switch opens, but substantially less than the maximum voltage which can be safely impressed on the governor circuit.

CHARLES T. EVANS.